Oct. 11, 1955 R. J. DOLUDE 2,720,602
SYMMETRICAL, TEMPERATURE-COMPENSATED, DIRECT-CURRENT MOTOR
Filed April 28, 1953 4 Sheets-Sheet 1
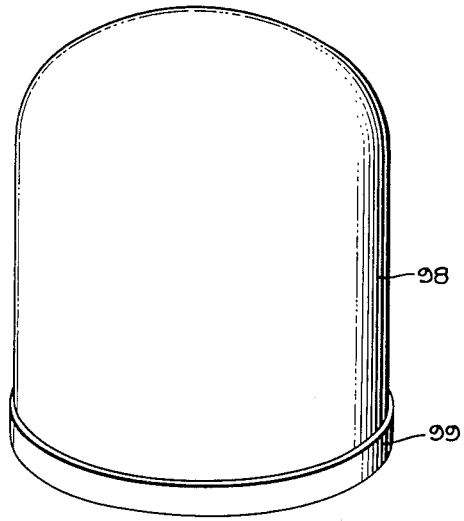
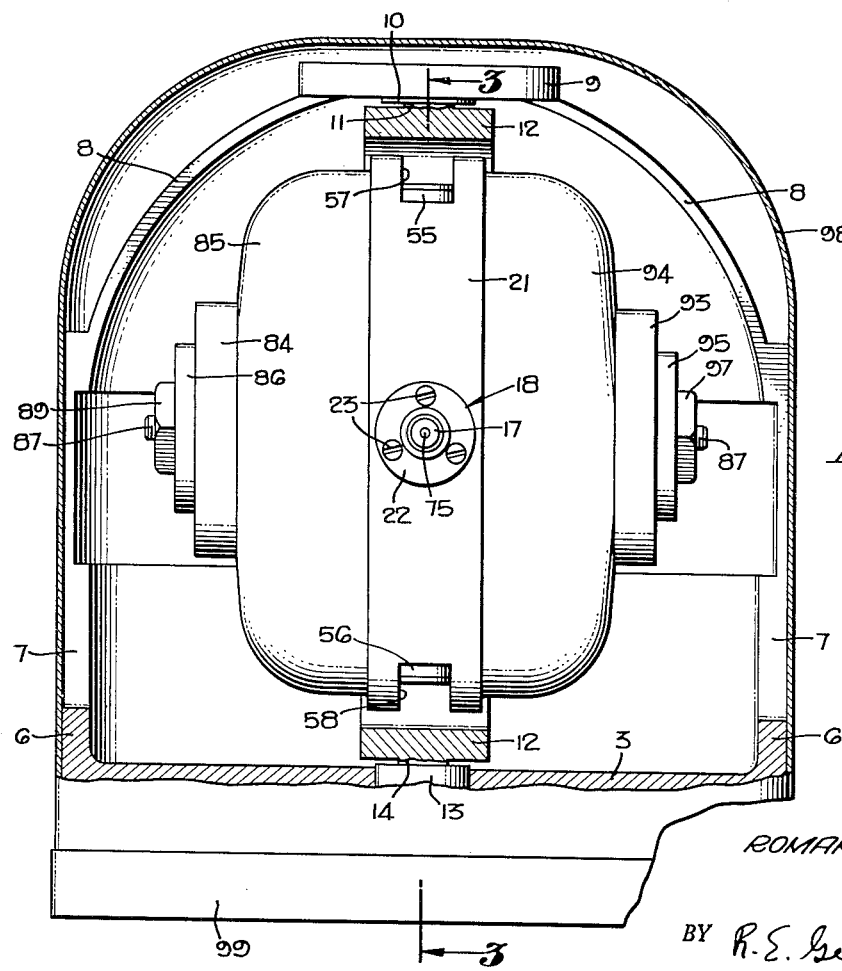
ROMAN J. DOLUDE,
INVENTOR.
BY R. E. Geangue
ATTORNEY

ROMAN J. DOLUDE,
INVENTOR.

BY R. E. Geauque

ATTORNEY

Oct. 11, 1955   R. J. DOLUDE   2,720,602
SYMMETRICAL, TEMPERATURE-COMPENSATED, DIRECT-CURRENT MOTOR
Filed April 28, 1953   4 Sheets-Sheet 4

ROMAN J. DOLUDE,
INVENTOR.

BY R. E. Geauque

ATTORNEY

United States Patent Office 2,720,602
Patented Oct. 11, 1955

2,720,602

SYMMETRICAL, TEMPERATURE-COMPENSATED, DIRECT-CURRENT MOTOR

Roman J. Dolude, Los Angeles, Calif., assignor to Summers Gyroscope Company, Santa Monica, Calif., a corporation of California Application April 28, 1953, Serial No. 351,635

10 Claims. (Cl. 310—74)

This invention relates to a symmetrical, temperature-compensated, direct-current motor, and more particularly to a direct-current gyroscope motor which is symmetrically arranged so that expansions of motor parts resulting from temperature changes will not unbalance the motor about the gimbal axes.

It has been customary to have symmetrical, synchronous, alternating-current motors since these motors do not require commutators due to the fact that the winding is stationary and the rotor moves relative to the winding. However, in direct-current motors, it is necessary to have a commutator and brushes in order to supply current to movable windings. In previous direct-current motors, especially for use with gyroscopes having rotor masses, it was necessary to make the rotor cup-shaped and the rotor could be supported for rotation at only one point on the shaft since the magnets had to be positioned and supported around the rotating windings and between the windings and the rotor. In other words, if the rotor were supported at both sides of the rotating winding so as to be symmetrical about the windings, there would be no way to support the stationary magnets in position to cooperate with the windings.

The cup-shaped rotor of prior direct-current motors is undesirable because the rotor expands with temperature changes and places the gyroscope out of balance about the supporting axes, and for rotors that are to be driven at high speeds, it is very difficult to get the correct balance of the motor about the gyroscope axes. Also, when a cup-shaped rotor is used, the brushes and commutator must be placed at one side or the other of the winding, and the gyroscope becomes unbalanced as the brushes and commutator are worn away. Further, with the brushes and commutator positioned on one side of the winding, special precautions must be taken to prevent commutator dust from collecting in the bearings on the commutator side of the winding. The present invention overcomes the undesirable features of previous direct-current motors by utilizing two separate sets of windings and two rotors which are symmetrically arranged on the motor shaft about the supporting axes. The rotor for each winding can be made cup-shaped without unbalancing the motor about its pivotal axes when temperature changes take place since the rotors will expand or contract in different directions an equal amount to remain in balance. Each rotor can be made only one half the length of the usual single rotor of previous motors so that the rotor mass is unchanged, and instead of the expansion or contraction being wholly in a direction to unbalance the motor, as in previous motors, the expansion of each section counteracts the expansion of the other. Further, by utilizing the two rotors of the present invention, the commutator and brushes can be centrally positioned on the motor shaft between the two rotors, and therefore the wear of these parts will not affect the balance of the gyroscope. Since the rotors are positioned between the commutator and the end bearings, these bearings will be protected against commutator dust by the motor elements positioned on each side of the commutator without the need of other special bearing protective means.

Another feature of the present invention resides in the use of a steel strut, which passes completely through the motor components and holds the motor together, and since the strut is made of the same material as the other motor components, it will contract and expand due to temperature changes the same as the other components and will hold the end bearings in place without binding the bearings or the bearings becoming loose because of this contraction or expansion. Therefore, this invention eliminates the use of bearing preload springs which have been required to accomplish the same result in prior motors. The difficulty with the use of preload springs is that they can be used only on one bearing, and therefore the mass of the motor can be moved in only one direction, which movement can only result in unbalance of the motor about its supporting axes.

It is therefore an object of the present invention to provide a symmetrical direct-current motor which is temperature-compensated so as to prevent the motor from becoming unbalanced.

Another object of the present invention is to provide a symmetrical, direct-current motor which is mounted upon pivotal axes and which is constructed to prevent the expansion and contraction of motor components due to temperature changes from unbalancing the motor about its axes.

A still further object of the present invention is to provide a symmetrical, pivotally mounted direct-current motor in which the commutator is centrally positioned with respect to the pivotal axes so that wear of the commutator and corresponding brushes will not cause unbalance of the motor.

A further object of the invention is the provision of a symmetrical, direct-current motor which can be utilized as a gyroscope motor and which has the complete motor assembly secured together by a central strut having the same expansion and contraction coefficients as the other components of the motor so that the end bearings for the motor can be positioned by said strut without binding or becoming loose.

A still further object of the invention is to provide a symmetrical direct-current motor in which the commutator is centrally located and the end bearings are protected against commutator dust by components of the motor positioned between each end bearing and the commutator.

These and other objects not specifically enumerated above will become readily apparent from the accompanying description and drawings, in which:

Figure 1 is a perspective view of the instrument casing for a gyroscope utilizing the symmetrical, direct-current motor of the present invention.

Figure 2 is a vertical section, with parts left in elevation, through the casing of Figure 1, showing the manner in which the motor is universally supported.

Figure 3:
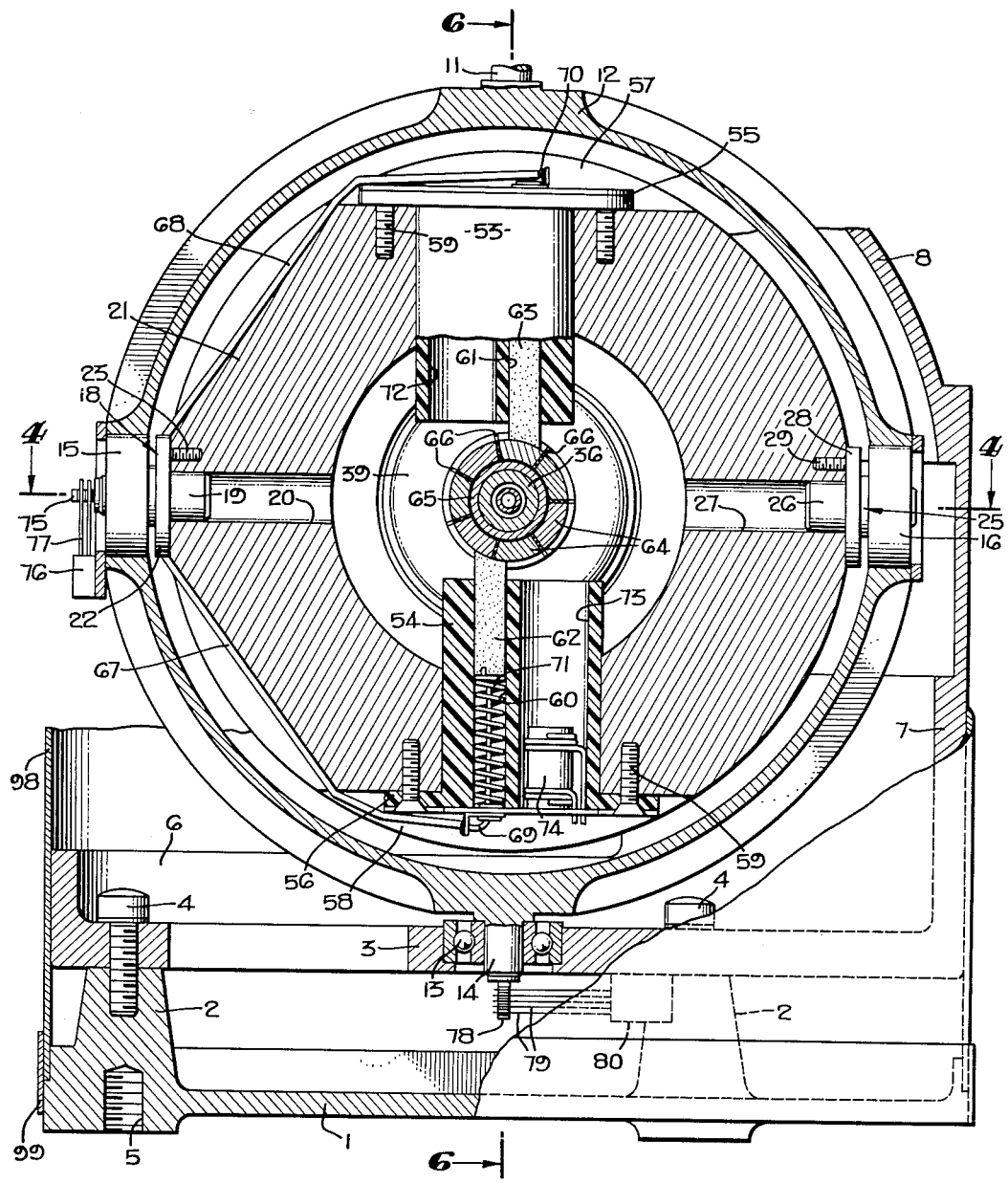
Figure 3 is a transverse vertical section along line 3—3 of Figure 2, with some parts in elevation, illustrating the support for the motor and the motor commutator.
Figure 4:
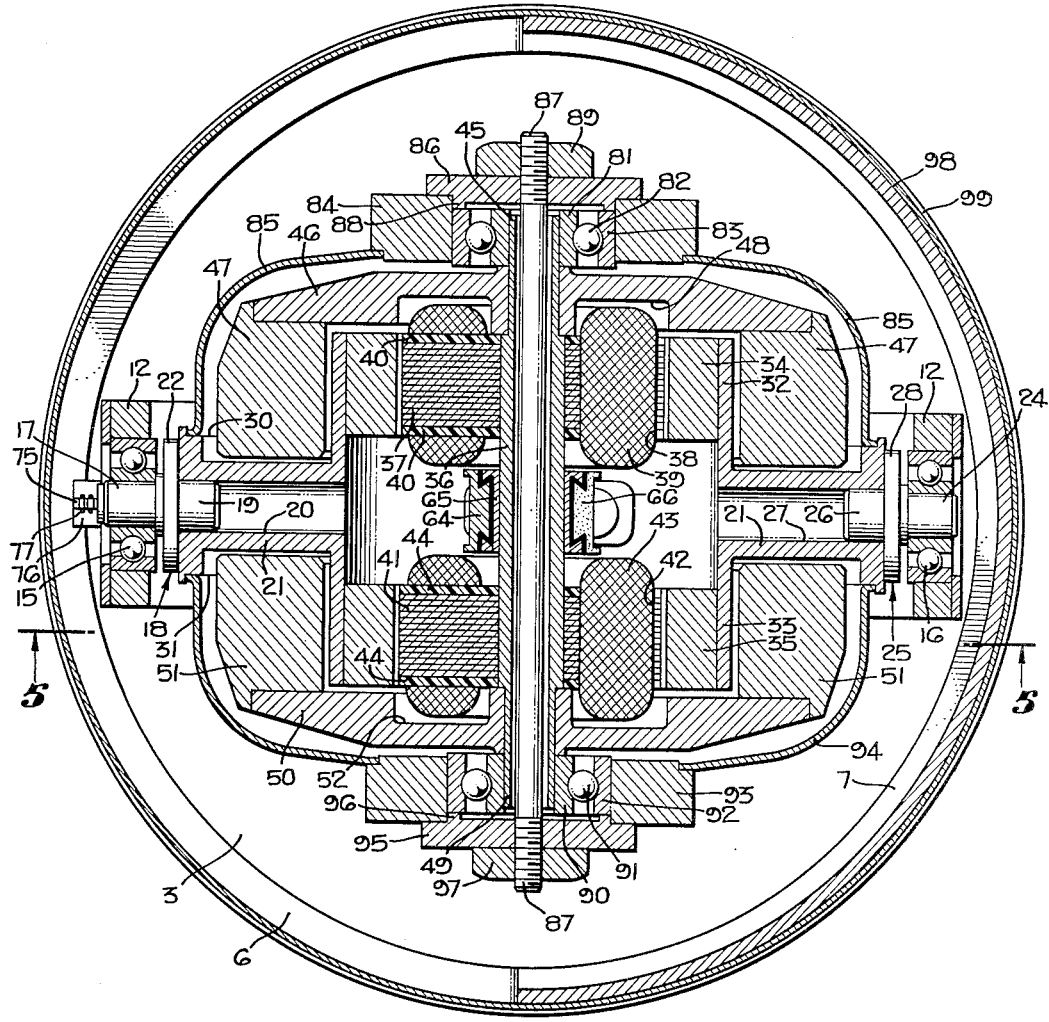
Figure 4 is a horizontal sectional view along line 4—4 of Figure 3 illustrating the two symmetrical rotors and the two symmetrical windings for the motor of the present invention.
Figure 5:
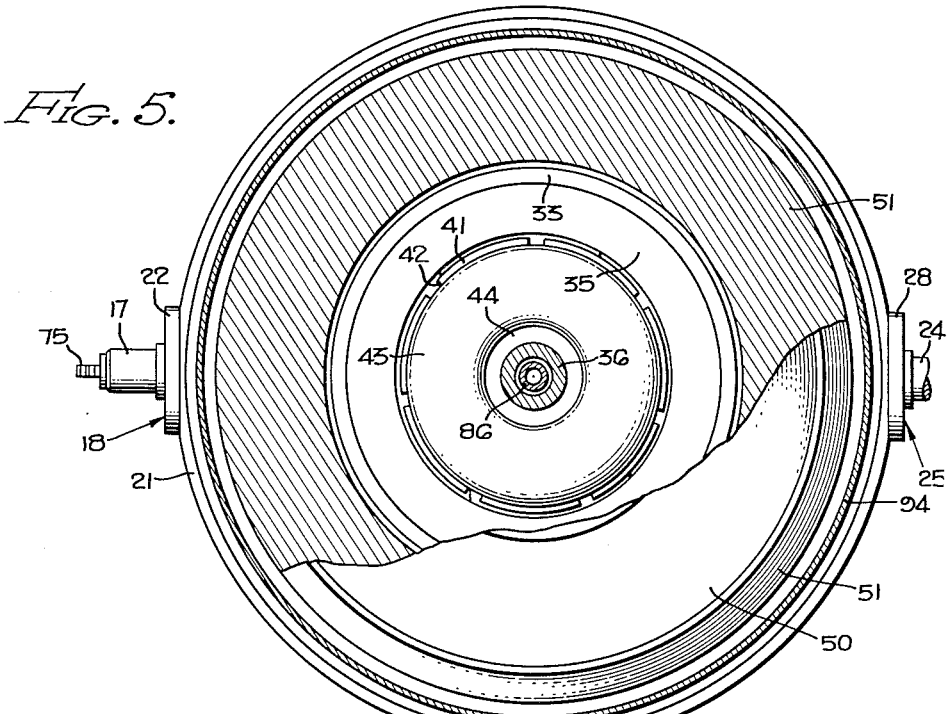
Figure 5 is a transverse vertical section along line 5—5 of Figure 4.
Figure 6:
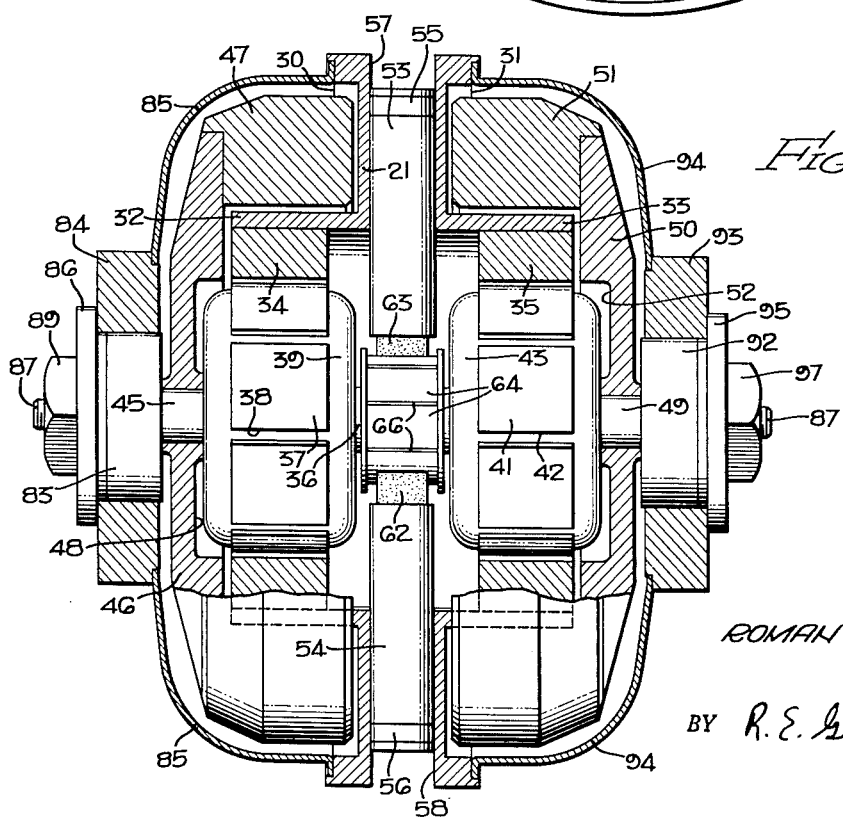
Figure 6 is a vertical sectional view along line 6—6 of Figure 3, with some parts left in elevation, and illustrating the symmetrical parts of the motor.

The embodiment of the present invention chosen for illustration comprises a platform 1 having extensions 2 for supporting a second platform 3 in spaced relationship with platform 1. Screws 4 serve to secure platform 3 to extensions 2, and extensions 2 also have threaded openings 5 for receiving the instrument mounting bolts. The platform 3 is circular and has one edge 6 which projects upwardly from the platform around half of the circumference, while projection 7 extends from the other half of the circumference of platform 3 and mounts a semi-dome section 8 which is integral with projection 7. A circular ball bearing retainer member 9 is secured to the top of semi-dome 8 and retains ball bearings 10 which receive shaft 11 to pivotally support one side of the outer gimbal ring 12. The platform 3 contains ball bearings 13, which receive shaft 14, in order to pivotally mount the other side of the outer gimbal ring 12.

The outer gimbal ring 12 has openings for ball bearings 15 and 16 and the ball bearing 15 receives the extension 17 of shaft member 18. The member 18 likewise has an extension 19 which projects into a circular opening 20 in the motor frame 21. A circular projection 22 of member 18 is secured to frame member 21 by screws 23 so that the frame member 21 and shaft extension 17 move as a unit and are pivotally supported by ball bearing 15. The ball bearing 16 receives a shaft extension 24 of shaft member 25 and a projection 26 of member 25 projects into an opening 27 in frame member 21. The circular collar 28 of member 25 is rigidly secured to frame member 21 by screws 29 so that the shaft 24 and the frame member 21 are pivotally mounted by ball bearings 16. It is thus apparent that the motor frame member 21 serves as the inner gimbal for the gyroscope and also as a support for the gyroscope motor. The frame 21 is universally supported in that it can rotate about the inner gimbal axis on bearings 15 and 16 and can also rotate about the outer gimbal axis on bearings 10 and 13.

The motor frame 21 is generally circular in form and has an upper ledge 30 and a lower ledge 31. The frame also has a circular central opening defined by upper extension 32 and lower extension 33 which are circular in form. A circular magnet 34 is rigidly supported by extension 32 while a circular magnet 35 is rigidly attached to extension 33. The motor shaft 36 projects axially through the opening in frame 21 and mounts at one side a number of motor laminations 37 which have radial slits 38 to receive the individual motor windings 39 which altogether form the complete motor winding. The laminations are protected by insulated covers 40 and are generally circular in form so that the windings 39 and the laminations 37 can rotate within the opening of magnet 34. The other side of the shaft 36 likewise carries a number of laminations 41 which have radial slits 42 for receiving a number of windings 43 which pass around each radial projection of the laminations defined by the slits. The laminations 41 have protective covers 44 and are generally circular in form so that the windings 43 and laminations 41 can revolve within the opening in magnet 35. While the windings 39 and 43 are illustrated as continuous, it is understood that these windings actually consist of a number of coils wrapped around a number of radial projections formed by laminations 41 and 37.

The shaft 36 has a reduced portion 45 to which is secured a circular flywheel arm 46, and this arm mounts a circular flywheel 47 which forms one-half of the rotor for the gyroscope. The flywheel 47 is of sufficient diameter so that it rotates around extension 32 of motor frame 21 and flywheel arm 46 has a circular groove 48 to receive a portion of windings 39. In a similar manner, the reduced extension 49 of shaft 36 rigidly mounts a flywheel arm 50 to which is attached a flywheel 51 forming the other half of the rotor for the gyroscope. The flywheel 51 is in the form of a circular ring of sufficient diameter to rotate around projection 33 of frame member 21, and flywheel arm 50 has a circular groove 52 to receive a portion of windings 43.

The frame member 21 has radial openings positioned perpendicular to the inner gimbal axis for receiving insulated brush holders 53 and 54. These brush holders have end plates 55 and 56 respectively which are positioned in surface grooves 57 and 58 of frame 21, and both brush holders are secured to frame 51 by screws 59. The rectangular opening 60 in brush holder 54 and the rectangular opening 61 in brush holder 53 contains brushes 62 and 63 respectively. Both brushes 62 and 63 have curved end surfaces which continually bear against commutator bars 64 mounted on the center of shaft 36 by sleeve 65. There are seven such commutator bars which are each separated by insulated sections 66 of the same cross-sectional shape as the bars, and the sections 66 and the commutator bars 64 have an irregular shape so that they can be received in a slot in sleeve 65. Direct-current is supplied to brushes 62 and 63 through leads 67 and 68, respectively, and these leads connect with smaller leads 69 and 70, respectively, which pass through the cover plates 56 and 55 and then to the ends of the brushes. Each brush is continually urged into contact with the commutator surface by springs 71 (only one of which is shown) positioned in the openings 60 and 61. The brush holders 53 and 54 also have circular openings 72 and 73, respectively, which house condensers 74 (only one of which is shown) connected in the usual way to reduce the sparking of the commutators. The shaft 17 has an extension 75 which carries two slip rings, and a bracket 76 is secured to the outer gimbal ring 12 and mounts two wire wipers 77 which continually bear on the two slip rings. The slip rings have leads which pass through the bearing 15 and the shaft 17 and connect with leads 67 and 68. The wire wipers 77 are connected in the usual manner with leads passing through shaft 14 to slip rings carried on extension 78 of shaft 14. A number of wipers 79 are mounted by an insulated bracket 80 on one of the extensions 2 in order to supply the necessary power required for the gyroscope to the slip rings on extension 78, including the power for the direct-current motor.

As has been previously described, the direct-current motor of this invention has a commutator centrally mounted on shaft 36, and the windings 39 and 43 and flywheels 47 and 51 are symmetrically mounted with respect to the center of shaft 36. Since the center of shaft 36 will be positioned at the point where the gimbal axes intersect the shaft, it is apparent that the windings and flywheels will also be symmetrical with respect to the gimbal axes. Also, the motor frame 21 and the magnets 34 and 35 are likewise symmetrical about the center of shaft 36 and about the gimbal axes, and the openings in frame 21 for the brush holders are so arranged as to maintain perfect balance about both gimbal axes. It is understood that these parts are symmetrical in that equal masses are distributed equal distances on opposite sides of the gimbal axes and the center of shaft 36 so that no unbalancing torques are exerted by the masses.

In order to support shaft 36 for rotation relative to frame member 21, the extension 45 of shaft 36 is received by the inner race 81 of ball bearings 82, the outer race 83 of which is retained by a circular ring 84. The ring 84 is supported by a casing member 85 which has one edge received by a groove in extension 30 and the other edge attached to the ring. The casing 85 is positioned around flywheel 47 and held in position by a nut 86 which is threaded onto one end of strut 87. The nut 86 has an extension 88 which bears against the outer race in order to correctly position it with respect to the inner race, and a lock nut 89 serves to retain the nut 86 in position. In a similar manner, the extension 49 of shaft 36 is received by the inner race 90 of ball bearings 91 and the outer race 92 is retained in a circular ring 93 which is supported by a casing member 94. This casing member 94 has one edge resting in a groove in frame extension 31 and the other edge secured to the ring 93 in order to support the ring. A nut 95 is threaded onto the other end of strut 87 and has an extension 96 which positions the outer race in correct relationship with the inner race, and a lock nut 97 serves to maintain nut 94 in the correct position. If necessary, shims can be placed between the extensions 88 and 96 and their corresponding outer races in order to exactly position the outer race. It is thus apparent that the strut 87 and the nuts 86 and 95 serve to retain casing members 85 and 94 around the motor, and that the casing members 85 and 94 are locked in position by lock nuts 89 and 97. Since the strut 87 is positioned centrally of shaft 36 and is constructed of the same material as the shaft, it is subjected to the same temperature changes in the vicinity of the shaft and to the same expansion and contraction due to temperature changes, and therefore the inner and outer races of the bearings 82 and 91 can move together during temperature changes so as to prevent binding of the bearings and no further adjustments, such as preload springs, will be required for either bearing. Also, the inner and outer races of both bearings will expand radially together so as to prevent the bearings from becoming loose. The complete motor assembly has a cover 98 which is retained in a groove in platform 1 by ring 99 so that the whole assembly can be maintained in a dust-free condition.

In operation, direct-current is supplied to the windings 39 and 43 of the motor through the commutator brushes 62, 63 and the commutator bars 64 which are connected to the windings in the usual manner. This supply of direct-current will cause the windings and supporting laminations to rotate with shaft 36 and thereby rotate the flywheels 47 and 51, which comprise the gyroscope rotor. Since these flywheels are positioned symmetrically about the center of the motor and about the pivotal axes of the motor, the expansion and contraction of the flywheels 47 and 51 due to temperature changes cannot result in unbalance of the motor about its pivotal axes since the expansion and contraction of one flywheel will balance that of the other. By dividing the rotor, it is possible to utilize a symmetrical motor frame for symmetrical positioning the permanent magnets on opposite sides of the center of the motor in a fixed manner with respect to the rotating parts of the motor, and, thus, no unbalance can result from expansion or contraction of the motor frame and magnets due to temperature changes. Also, by dividing the flywheel sections comprising the gyro rotor, it is possible to have the commutator and commutator brushes centrally located on the shaft of the motor so that any wear of the brushes or commutator bars will not result in unbalance of the gyro motor since the wear will take place in a substantially equal amount on both sides of the center of the shaft. Because the commutator is centrally located, the bearings 82 and 91 are protected against becoming contaminated with commutator dust by the parts of the motor interposed between the commutator and the bearings. Since the outer races of the ball bearings for the motor are located by the steel strut passing through the motor, it is possible to place the bearings 82 and 91 in proper position to support shaft 36 and no additional adjustments need be provided for changing the position of the bearings to account for expansion or contraction of the motor shaft due to temperature changes since the strut and the motor shaft will expand or contract equally, and allow the bearings 82 and 91 to remain symmetrical about the center of the shaft during temperature changes without binding or becoming loose.

By the present invention, a symmetrical, temperature-compensated direct-current motor has been provided which has its permanent magnets, windings, laminations, and flywheels symmetrically arranged about the center of the motor so that when the motor is supported as a gyroscope motor, there can develop no unbalance of the motor about the gimbal axes of the gyroscope because of temperature changes. Also, a novel means has been utilized for changing the positions of the bearings for the rotor without causing unbalance of the motor and without the need of special devices such as bearing preload springs. Such a motor is highly useful in the field of gyroscopic instruments since the rotors of each instrument are driven at very high speeds, and any unbalance of the rotor causes serious vibrational and other well known problems. It is apparent that the usefulness of the motor of the present invention is not limited to use in gyroscopes but has utility in any instrument where perfect balance of the motor is desirable. Further, the invention is not limited to any particular type of direct-current motor but is directed generally to direct-current motors which have rotating windings. Also, it is apparent that the manner in which the motor is mounted by the gimbal rings of a gyroscope can be varied to obtain any desired position of the rotor with respect to the mounting for the gyroscope. Various other modifications are contemplated and may obviously be resorted to by those skilled in the art, without departing from the spirit and scope of the invention, as herein defined by the appended claims.

What is claimed is:

1. In a direct-current motor mounted about at least one axis for rotational movement thereabout, a motor frame pivotally mounted about said axis and having casing members for supporting the end bearings of said motor, first and second motor components each comprising a magnet, and a winding in cooperating relationship with respect to said magnet, fly-wheels positioned symmetrically about the axis of rotation and surrounding the motor components, a motor shaft for rotatably supporting the winding and flywheel of each motor component, each of said magnets being supported by said frame and said motor shaft being supported by said end bearings each of said bearings having an inner race and an outer race, said inner races being mounted on said motor shaft, and means for interconnecting said outer races and subject to expansion and contraction due to temperature changes to a degree substantially identical with said motor shaft for causing axial movement of said races in unison for maintaining said bearings in adjustment position.

2. In a direct-current motor being mounted for rotation about at least one axis, a motor frame member symmetrically arranged about said axis and mounted for rotation about said axis, a motor shaft passing through said frame, end bearings for said shaft having their inner races secured to such shaft and their outer races supported by casing members carried by said motor frame, a strut passing completely through a center opening in said shaft and having means for positioning the outer races for said bearings longitudinally of said shaft relative to said inner races, a pair of motor components symmetrically arranged about said axis and each comprising a magnet carried by said motor frame, a winding in cooperating relationship with respect to said magnet and flywheel carried by said shaft, said shaft and said strut being composed of similar material so that the position of said bearings will be adjusted upon expansion or contraction of said shaft and strut due to temperature changes without binding of the bearings.

3. A direct-current motor, as defined in claim 2, having a commutator carried at the center of said shaft and commutator brushes carried by said motor frame so that wear of the commutator parts will not cause unbalance of said motor about said axis.

4. A direct current motor of the type to be mounted for rotational movement about one axis comprising two independent motor components each comprising a stationary magnet, a rotating winding positioned in cooperating relationship with respect to said magnet, and a rotating fly-wheel, a single motor shaft for supporting the rotating windings and fly-wheels, a frame member for supporting said stationary magnets, casing members mounted by said frame members for enclosing said motor components, and bearings mounted in said casings for rotatably supporting said shaft, said shaft having an axial opening formed therein, and a strut passing through said axial opening of said shaft and interconnecting said bearings for maintaining said bearings in adjusted position irrespective of expansion or contraction of said motor shaft in response to temperature changes.

5. In a symmetrical direct current motor for use in driving the rotor of a gyroscope, means for mounting said motor by inner and outer gimbals to provide for universal movement of said motor about the gimbal axes, a motor frame rotatably supported about the axis of one of said gimbals and so constructed as to have its mass symmetrically arranged about both of said axes, a pair of motor magnets carried by said motor frame and having their masses symmetrically arranged about both of said axes, a motor shaft positioned perpendicular to said gimbal axes and having its center located at the intersection of said axes, a pair of windings secured to said shaft and positioned to cooperate with said magnets and likewise symmetrically arranged about the center of said shaft, a pair of fly-wheels mounted adjacent opposite ends of said shaft to be rotated by said windings, said fly-wheels likewise having their masses symmetrical about the center of said shaft so that expansion or contraction of the motor components in each unit will compensate for like changes in the other unit to preserve motor balance about its pivotal axes, and bearings for rotatably supporting said shaft, the ends of said motor shaft projecting beyond said fly-wheels mounting the inner races of said end bearings, casing members carried by said motor frame for mounting the outer races of said end bearings, said motor shaft having formed therein an axial opening, and a strut passing through said opening in said shaft and having means for positioning said outer race longitudinally of said shaft, said bearing components and said strut and shaft being constructed of similar material so that the bearing races will move together longitudinally and radially of said shaft upon changes in temperature in order to prevent the bearings from becoming loose or from binding.

6. A symmetrical temperature compensated direct current motor comprising two independent motor components, each comprising a stationary magnet, a rotating winding positioned in cooperating relationship with respect to said magnet, and a rotating fly-wheel, a single motor shaft for supporting the rotating windings and fly-wheels, said motor components being symmetrically arranged around the center of said shaft so that the expansion and contraction of the motor components in each unit will compensate for like changes in the other unit to preserve motor balance, casing members enclosing said motor components, bearings mounted in said casing members and positioned for rotatably supporting said motor shaft, and means for interconnecting said bearings and subject to expansion and contraction due to temperature changes to a degree substantially identical to said motor shaft for maintaining said bearings in adjusted position irrespective of expansion and contraction of said motor shaft.

7. A symmetrical temperature compensated direct current motor comprising two independent motor components, each comprising a stationary magnet, a rotating winding positioned in cooperating relationship with respect to said magnet, and a rotating fly-wheel, a single motor shaft for supporting the rotating windings and fly-wheels, said motor components being symmetrically arranged around the center of said shaft so that the expansion and contraction of the motor components in each unit will compensate for like changes in the other unit to preserve motor balance, casing members enclosing said motor components, bearings mounted in said casing members and positioned for rotatably supporting said motor shaft, each of said bearings having an inner and outer race, and means for interconnecting the outer races of said bearings and subject to expansion and contraction due to temperature changes to a degree substantially identical to said motor shaft for maintaining said bearings in adjusted position irrespective of expansion and contraction of said motor shaft.

8. A symmetrical temperature compensated direct current motor comprising two independent motor components, each comprising a stationary magnet, a rotating winding positioned in cooperating relationship with respect to said magnet and a rotating fly-wheel, a single motor shaft for supporting the rotating windings and fly-wheel, said motor components being symmetrically arranged around the center of said shaft so that the expansion and contraction of the motor components in each unit will compensate for like changes in the other unit to preserve motor balance, casing members enclosing said motor components, bearings mounted in said casing members and positioned for rotatably supporting said motor shaft, each of said bearings having an inner and outer race, said motor shaft having an axial opening formed therein, and a strut received in said axial opening and interconnecting the outer races of said bearings and subject to expansion and contraction due to temperature changes to a degree substantially identical to said motor shaft for maintaining said bearings in adjusted position irrespective of expansion and contraction of said motor shaft.

9. A symmetrical temperature compensated direct current motor comprising two independent motor components, each comprising a stationary magnet, a rotating winding positioned in cooperating relationship with respect to said magnet, and a rotating fly-wheel, a single motor shaft for supporting the rotating windings and fly-wheel, said motor components being symmetrically arranged around the center of said shaft so that the expansion and contraction of the motor components in each unit will compensate for like changes in the other unit to preserve motor balance, casing members enclosing said motor components, bearings mounted in said casing members and positioned for rotatably supporting said motor shaft, each of said bearings having an inner and outer race and said motor shaft having an axial opening formed therein, and a strut received in said opening and interconnecting the outer races of said bearings and composed of material similar to said motor shaft for causing axial movement of said races in unison for maintaining said bearings in adjusted position irrespective of expansion and contraction of said motor shaft.

10. In a motor having a single motor shaft and a pair of motor components of equal mass arranged symmetrically with respect to the axes of said motor shaft and equally disposed on opposite sides from the center of said shaft so that expansion and contraction of the motor components in each unit will compensate for like changes in the other unit for maintaining motor balance, a motor casing for enclosing said motor components and said shaft, end bearings mounted in said casing, each of said bearings having an inner and outer race, said inner races being mounted on said shaft adjacent the opposite ends thereof, said shaft having an axial opening formed therein, a strut received in said opening and interconnecting each of said outer races and composed of the same material as said shaft for causing axial movement of said races in unison for maintaining said bearings in adjusted positions.

References Cited in the file of this patent
UNITED STATES PATENTS

| Number | Name | Date |
|---|---|---|
| 455,726 | Brown | July 7, 1891 |
| 2,513,227 | Wylie | June 27, 1950 |
| 2,532,700 | Eurich et al. | Dec. 5, 1950 |
| 2,653,481 | Mathiesen | Sept. 29, 1953 |